US012216217B2

(12) United States Patent
Borras et al.

(10) Patent No.: US 12,216,217 B2
(45) Date of Patent: Feb. 4, 2025

(54) METHOD AND SYSTEM FOR ADAPTIVE GNSS SAMPLING RATE TO IMPROVE MILEAGE REPORTING ACCURACY OF A ROAD USAGE CHARGE (RUC) SYSTEM

(71) Applicant: GEOTOLL, INC., Boca Raton, FL (US)

(72) Inventors: Jaime Andres Borras, Miramar, FL (US); Wyatt Drake Geist, Davie, FL (US)

(73) Assignee: GEOTOLL, INC., Boca Raton, FL (US)

( * ) Notice: Subject to any disclaimer, the term of this patent is extended or adjusted under 35 U.S.C. 154(b) by 0 days.

(21) Appl. No.: 18/669,155

(22) Filed: May 20, 2024

(65) Prior Publication Data

US 2024/0385331 A1   Nov. 21, 2024

Related U.S. Application Data

(60) Provisional application No. 63/467,793, filed on May 19, 2023.

(51) Int. Cl.
*G01S 19/37* (2010.01)
*G01C 22/00* (2006.01)
*G01S 19/52* (2010.01)

(52) U.S. Cl.
CPC .............. *G01S 19/37* (2013.01); *G01C 22/00* (2013.01); *G01S 19/52* (2013.01)

(58) Field of Classification Search
CPC .......... G01S 19/37; G01S 19/52; G01C 22/00
USPC ...................................... 342/357.77
See application file for complete search history.

(56) References Cited

U.S. PATENT DOCUMENTS

2016/0277897 A1* 9/2016 Wu ........................ G01S 19/34

FOREIGN PATENT DOCUMENTS

CN           104006822 B  *  3/2017  ............. G01C 22/00

* cited by examiner

*Primary Examiner* — Harry K Liu
(74) *Attorney, Agent, or Firm* — The Concept Law Group, PA; Scott M. Garrett; Scott D. Smiley

(57) ABSTRACT

A road usage charge system tracks and reports the distance travelled by a vehicle. The accuracy of the distance driven versus competing considerations such as battery drain of the mobile device doing the reporting is augmented by defining a speed threshold. When the vehicle is travelling faster than the speed threshold, location sampling is performed less frequently, over larger distance intervals. However, when the vehicle is travelling at a speed less than the speed threshold, the location sampling rate is increased such that location sampling is performed at shorter distance intervals.

18 Claims, 14 Drawing Sheets

METHOD AND SYSTEM FOR ADAPTIVE GNSS SAMPLING RATE TO IMPROVE MILEAGE REPORTING ACCURACY OF A ROAD USAGE CHARGE (RUC) SYSTEM

CROSS REFERENCE

This application claims the benefit of U.S. provisional application No. 63/467,793, filed May 19, 2023, the entirety of which is hereby incorporated by reference.

FIELD OF THE INVENTION

The present invention relates generally to road usage charge systems, and more particularly to a method and system in which in-vehicle resources track location of the vehicle over time to determine a distance drive by the vehicle, and where the location sampling rate is dynamically adjusted based on speed of the vehicle.

BACKGROUND OF THE INVENTION

Many of today's road usage charge (RUC) pilot programs report miles driven data that is collected from OBD-II (on-board diagnostic port) dongles that connect to the vehicles computer system through the Controller Area Network (CAN). However, while on-board diagnostics (OBD) dongles are useful in ascertaining vehicle status and providing diagnostics about the different vehicle systems, "they are far from ideal when it comes to mileage verification systems." As used herein the term "mileage" refers to miles driven, or more generally distance driven.

Several of the issues with the OBD-II dongles confirmed by the pilot programs are: mileage reporting inaccuracies; inconvenience and unintentional failure; intentional tampering; privacy concerns and high expenses in their purchase, handling and replacement cost.

In some embodiments, the prior art uses the snap-to-road services (API) to improve the distance recorded mileage accuracy of the GPS in RUC systems. This approach takes up to 100 GPS points (geolocation coordinate sets) collected along a route, and returns a similar data set, with the points snapped to the most likely road the vehicle was traveling along. Optimally, the points are interpolated, resulting in a path that smoothly follows the geometry of the road. However, this approach is not reliable because it can snap to adjacent roads affecting the location accuracy.

Another mileage reporting solution being tested in RUC pilots takes advantage of the relatively small population of internet-connected vehicles which may be able to access the vehicles status and diagnostic information from the different sub-systems directly via software. This approach does not depend on any additional hardware to verify the mileage traveled by the vehicle, improving many of the issues with the OBD-II dongles. However, even though it is a more efficient cost solution than the OBD-II dongle, it is still relatively expensive when compared to the inventive method described herein. Because it is based on a variable SaaS pricing model per API calls per vehicle in the RUC system per month, i.e., a small fleet of vehicles is very expensive with the cost scaling down as a function of vehicles volume. In addition, it requires a recurring software cost to support the API; annual recurring fees for the platform and its support; and a one-time registration fee for the API platform and the vehicle ODM. Whereas the invention described herein avoids all these fees.

Additionally, enhancements in the mileage reporting accuracy and cost-efficiency of a RUC system can be improved by using the last trip odometer value, instead of the odometer value of the beginning of the new trip. This prevents any initial issues with the GPS system acquiring the proper number of satellites for accurate reporting. And on the internet-connected vehicles case, avoiding the inaccuracies with the odometer readings associated with the missing tenths of miles not reported accurately in a number of ODM vehicles.

"Since the early 2000s, states have been at the forefront of discussions to explore possible replacements for the motor fuel tax (MFT). States are heavily reliant on MFT revenue as a source for transportation funds. According to the National Association of State Budget Officers' 2019 State Expenditure Report, "Motor fuel taxes represented the largest revenue source for transportation funds at 39.8%." https://www.ncsl.org/transportation/state-road-usage-charge-toolkit Motor fuel tax receipts are projected to decline as vehicles become more fuel-efficient and the surge of new electric vehicles continues to spark interest among buyers. Given these two major pressures on the MFT, states have begun to actively study, explore and pilot road user charge (RUC) systems as the most likely long-term replacement for declining MFT revenue. Also known as Vehicle Miles Traveled (VMT) or Mileage-Based User Fees (MBUF), these efforts have been supported by the federal government via the Surface Transportation System Funding Alternatives (STSFA) grant program.

Thus far, fourteen states and regional pilots (California, Delaware, Hawaii, Kansas, Minnesota, Missouri, New Hampshire, Ohio, Oregon, Texas, Utah, Washington, and Wyoming) have received federal grants to explore alternative funding mechanisms such as road usage charges. Colorado was awarded funds that they subsequently returned.

FIGS. 1 and 2 show the current prior art road usage charge (RUC) system block diagrams with the ODB-II and the Internet-Connected Vehicles, respectively. Common to both systems are the vehicle computer system, that is coupled to all of the other vehicle systems including a navigation system 104 that can include a satellite positioning receiver. The computer 102 is further coupled to the odometer 106, the charging system 108, the battery status 110, the fuel system 112, engine status 114, vehicle attributes 116, lock/unlock status 118, seat belt status 120, the vision system 122, and the personal area networking (PAN) transceiver, which can use, for example, the wireless interface known as BLUETOOTH. Some vehicles may have additional systems, and some may have fewer that those shown there in FIGS. 1 & 2. In FIG. 1, there is a ODB-II dongle device 126 connected to the vehicle's ODB (on board diagnostic) connector. The ODB dongle device 126 can interface with the computer 102 to access other systems for the purpose of tracking distance driven. For example, the navigation system can provide location information at regular intervals, and the total distance between the location points can be summed to obtain a total distance driven. The ODB dongle device 126 can also access odometer information. In FIG. 2 the computer 102 is connected to user's mobile device which includes a cellular transceiver 128 that can allow the vehicle to report distance driven.

FIG. 1 shows and existing OBD-II vehicle, and most of the subsystems tied to the vehicle computer system. Information about each of these subsystems is available through the OBD-II port. Thus a dongle device plugged into the OBD-II port can directly access navigation information and odometer information. FIG. 2 shows a system where user's mobile phone device connects to the vehicle system. This feature is only available in more recent vehicles. In older vehicles the mobile phone device can only connect to the vehicle audio system, and cannot interact with the vehicle computer.

FIGS. 3 and 4 show examples of the miles driven but not reported in the prior art systems with GNSS enabled. As shown in FIG. 3, the arrows 302, 304, 306 show the path where the vehicle traveled, and the arrow 308 show the GPS coordinate sequences reported to the server for calculation based on the system GPS sampling rate. This is because the location sampling is performed at fixed rate. The choice of the system GPS sampling rate in a mobile environment is a compromised between miles driven accuracy, battery life and processing cost. The longer the distance between the GPS coordinates sequence, the longer the battery life and the less frequent the coordinates need to be processed hence the lower the server cost, but the miles driven accuracy may be affected based on the road conditions. As shown in the FIG. 3, the calculated distance between the GPS coordinates in a straight path of road or highway, e.g., along arrow 302, is very accurate, but not so much around corners or U-turns. In this example, the GPS coordinates sampling rate was done at 100 m intervals and as shown around a corner the driven distance was 140 m (304, 306), hence accumulating on average 20% more miles driven than reported because the distance of arrow 308 is used instead. Thus, using a sampling rate that is battery efficient and server efficient causes an inaccuracy. In FIG. 4 the vehicle again follows the arrow path form location 418 along arrows 402, 404, 406, 408, 410 to location 420. However, because of the location sampling rate, the miles driven algorithm assumes the vehicle travelled along the path indicated by arrows 412, 414. Again, resulting in a substantial inaccuracy.

SUMMARY

In accordance with some embodiments of the inventive disclosure, there is provided a method for determining a distance driven by a vehicle, that incudes, at the vehicle, determining a speed of the vehicle, and when the speed of the vehicle is above at or above a first speed threshold value, sampling the location of the vehicle at a first rate. When the speed of the vehicle is below the first speed threshold value, sampling the location of the vehicle at a second rate such that sampling at the second rate occurs more frequently than sampling at the first rate. The method also includes recording each location sample to produce a location record comprising a plurality of location samples, and determining distance driven by the vehicle by summing the distance offsets between successive location samples of all of the plurality of location samples.

In accordance with a further feature, the method further comprises determining that the vehicle is on a private roadway, and while the vehicle is on the private roadway, suppressing location sampling, and when determining the distance driven determining a first sum that occurred before the vehicle entered the private roadway and a second sum that occurred after the vehicle left the private roadway and summing the first and second sums.

In accordance with a further feature, the first rate and second rate are distance intervals, and not time intervals.

In accordance with a further feature, the first rate is every 100 meters of distance travelled. In accordance with a further feature, the second rate is every 20 meters of distance travelled.

In accordance with a further feature, the first rate is a distance interval and the second rate is a time interval.

In accordance with a further feature, the first speed threshold is in a range equivalent to 35 to 45 miles per hour.

In accordance with a further feature, the method further includes receiving a geofence overlay defining a region in which a road usage charge is not assessed, determining that a portion of plurality of location samples are within the geofence overlay, and subtracting a distance driven in the region from the sum of the distance offsets.

In accordance with a further feature, the method further includes determining that a satellite signal used for sampling the location, has been lost. The method further includes, responsive to determining that the satellite signal has been lost, saving the last location sample, determining that the satellite signal has been reacquired, and responsive to determining that the satellite signal has been reacquired, obtaining a new location sample, and calculating a distance driven while satellite signal was lost as a difference in distance between the last location sample and the new location sample.

In accordance with some embodiments of the inventive disclosure, there is provided a system for determining a distance driven by a vehicle, that includes, at a mobile device in the vehicle, the mobile device is configured to: determine a speed of the vehicle. The device is further configured to, when the speed of the vehicle is above at or above a first speed threshold value, the mobile device samples the location of the vehicle at a first rate, and, when the speed of the vehicle is below the first speed threshold value, the mobile device samples the location of the vehicle at a second rate such that sampling at the second rate occurs more frequently than sampling at the first rate. The device is further configured to record each location sample to produce a location record comprising a plurality of location samples, and determine a distance driven by the vehicle by summing the distance offsets between successive location samples of all of the plurality of location samples.

Although the invention is illustrated and described herein as embodied in a road usage charge system, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. To the extent that the inventive disclosure relies on or uses software or computer implemented embodiments, the terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system. Those skilled in the art can understand the specific meanings of the above-mentioned terms in the embodiments of the present invention according to the specific circumstances.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
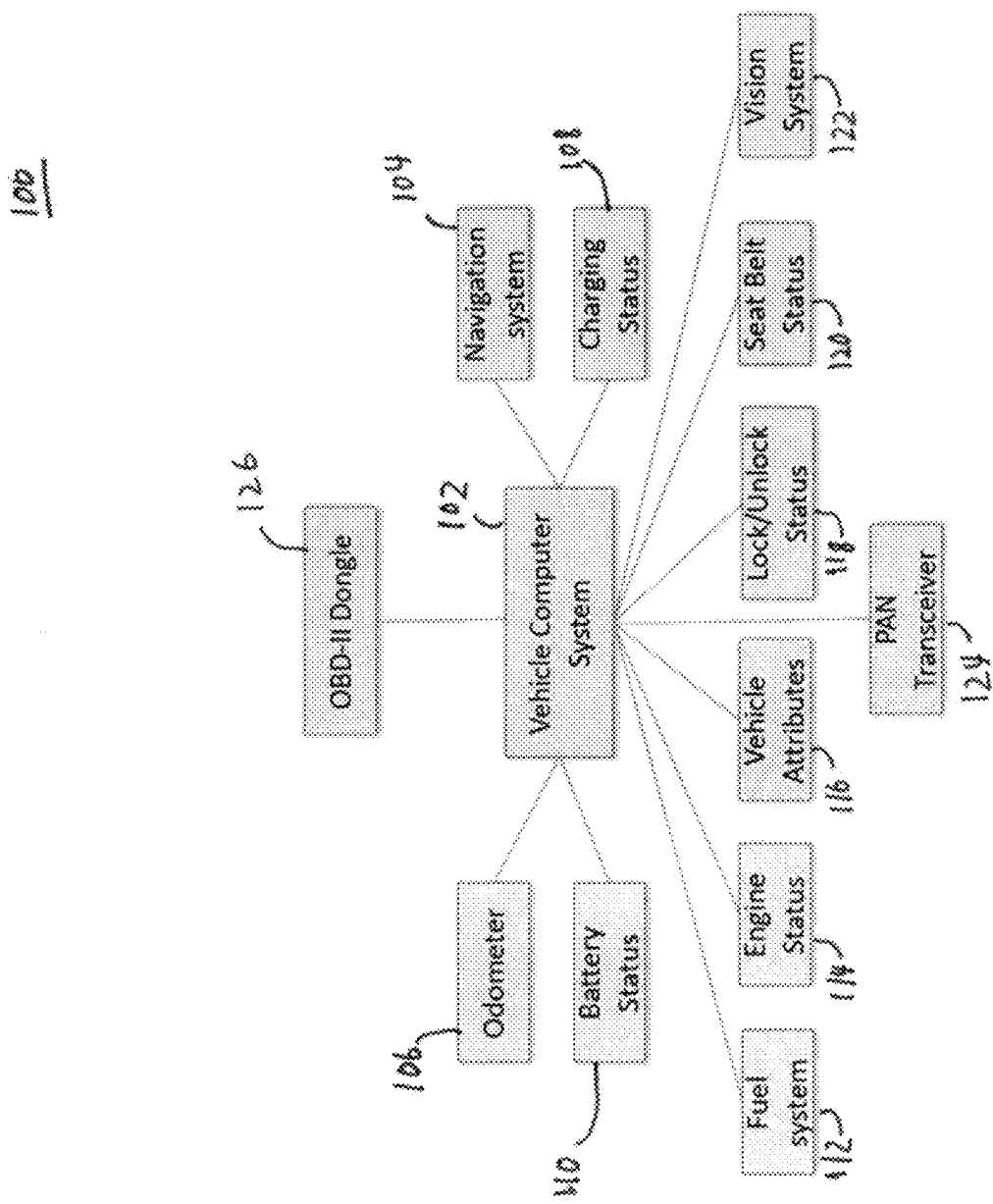
FIG. 1 shows a schematic block diagram of an existing vehicular system with an OBD-II dongle for tracking distance driven by the vehicle.
Figure 2:
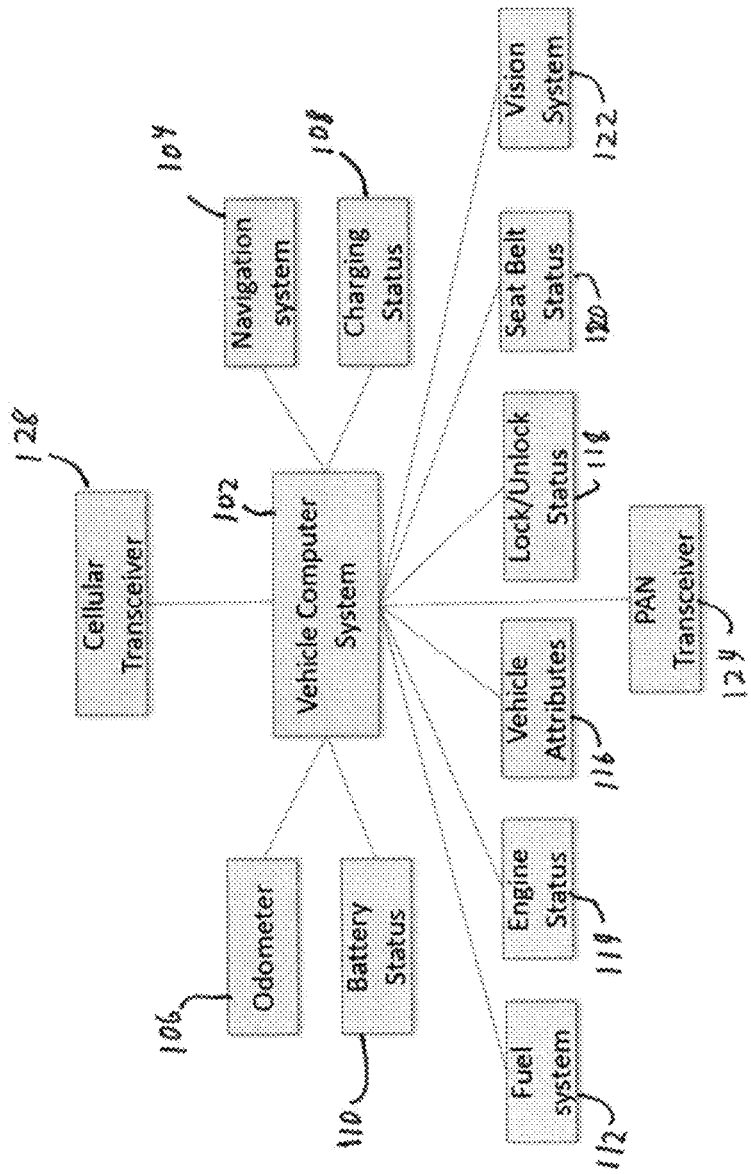
FIG. 2 shows a schematic block diagram an existing vehicular system that includes a cellular transceiver.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

As recently updated by the NCSL on the above reference, the largest revenue source for transportation funds, 40%, comes from motor fuel taxes; and it is predicted to decline as vehicles become more fuel-efficient and the surge of new electric vehicles continues to spark interest among buyers. For this reason, it is imperative to accurately report the vehicles' miles driven and the reason for this invention.

Figure 3:
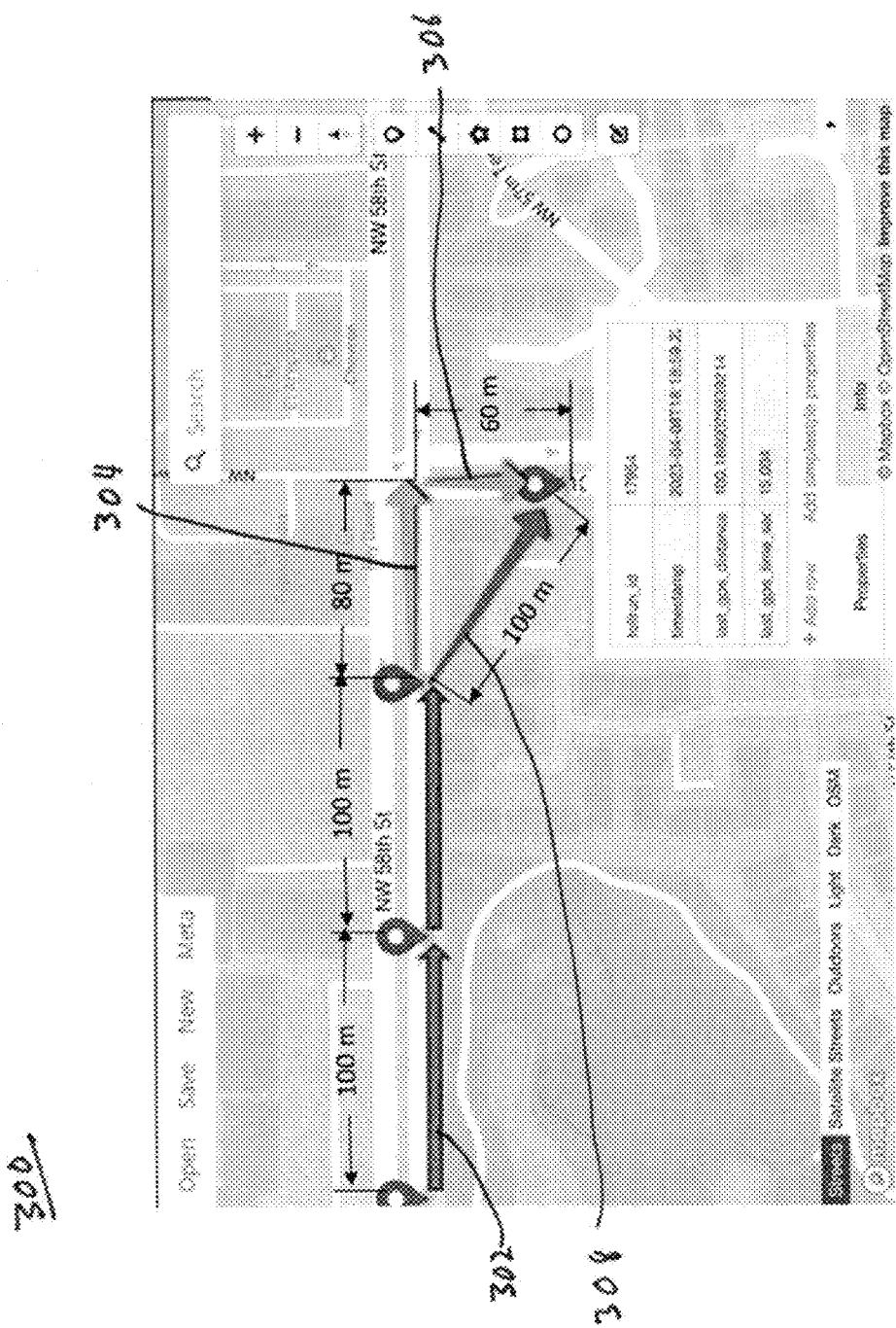
FIG. 3 shows how prior art distance driven tracking systems such as a ODB-II dongle device produce erroneous results.
Figure 4:
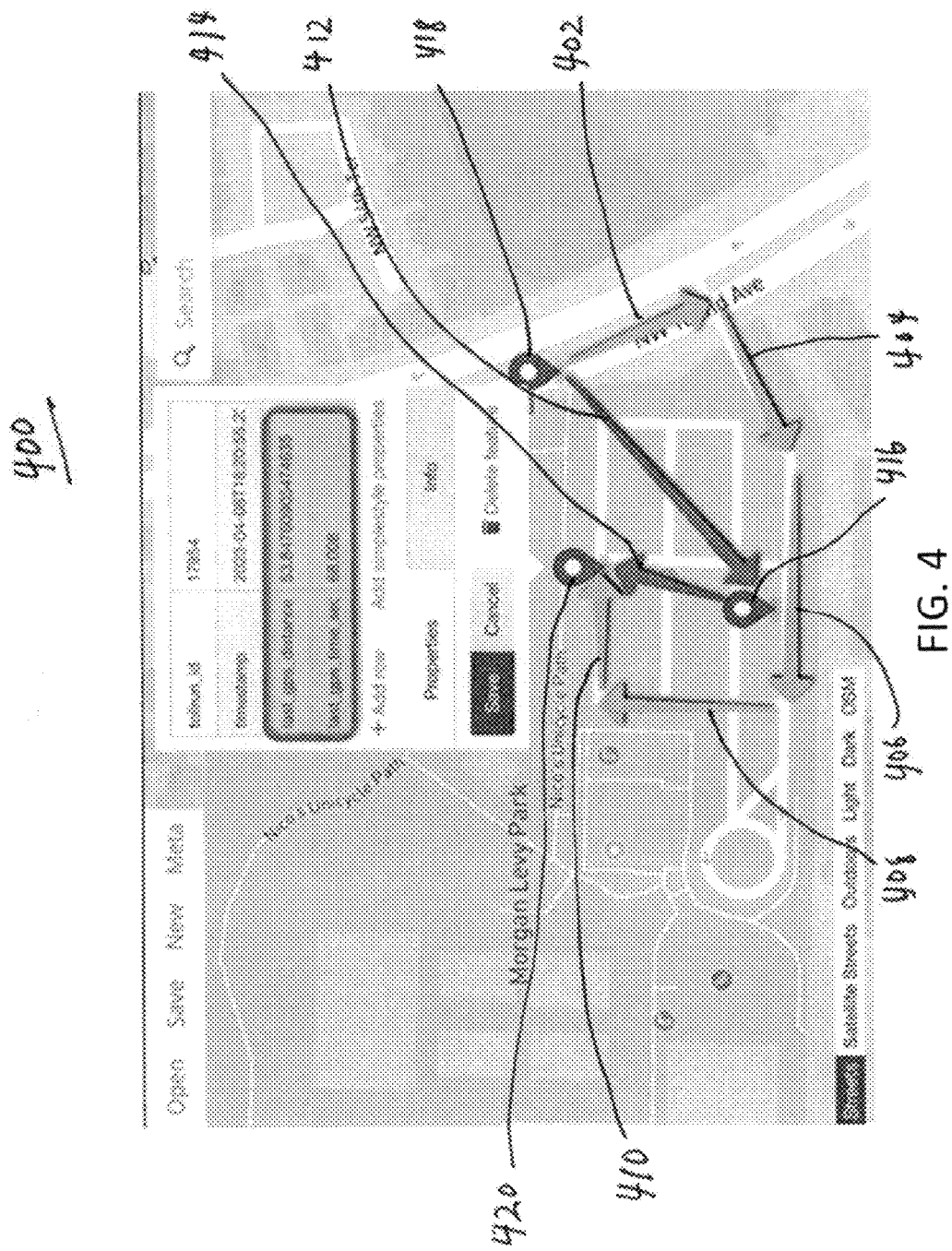
FIG. 4 shows another example of how prior art distance tracking produces erroneous results.
Figure 5:
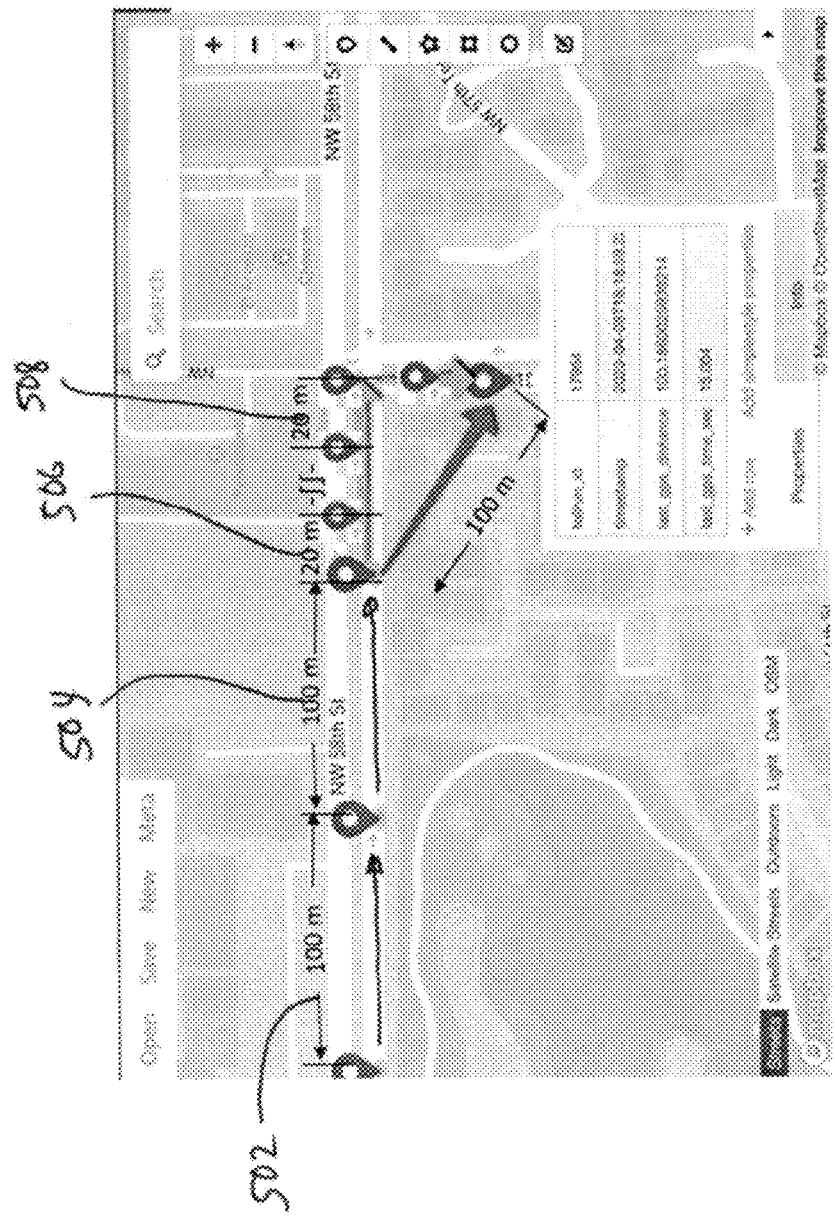
FIG. 5 shows how an adaptive location sampling rate in accordance with the inventive disclosure produces higher accuracy in tracking distance driven, in accordance with some embodiments.

The present solution/invention is the adaptive speed algorithm based on time rather than distance. That is rather than taking a location reading at every selected unit of distance, the invention dynamically adjusts the location sampling rate based on speed, where, generally, the slower the vehicle is moving, the more frequently the location is sampled. When a vehicle is traveling quickly it is less likely to make sharp turns that could introduce errors into the distance calculations between location samples. On the other hand, when a vehicle is in a city or residential area, it will be moving slower than it would be on a highway, and is more likely to take sharp turns. The dynamic sampling rate provides precision during lower speeds in traffic light turns, parking lots, U-turns, and roundabouts. GPS time intervals can be increased (less frequent) during high speeds 40-60 miles and 60+ miles an hour to conserve battery life and reduce processing cost on highways and straight paths. The example 500 of FIG. 5 illustrates the improvement. The example of FIG. 3 is repeated, and during intervals 502, 504 the vehicle is traveling above a pre-selected speed threshold, and the location samples are taken at 100 m intervals. This is consistent with the prior art, but by interval 506 the vehicle has slowed below the speed threshold, and as a result, the location sampling interval is much smaller, such as being taken every 20 m in intervals 506, 508 and continuing to the end of the trip at this rate. As a result, the total distance tracked is much closer to the actual distance travelled compared to the prior art method of FIG. 3.

The GNSS or GPS adaptive sampling rate algorithm is based on vehicle speed and improves mileage reporting accuracy. The accuracy of the miles reported is also influenced by the presence of the number of satellites visible to the mobile device or the strength of the GNSS/GPS signal. If the GNSS/GPS signal is lost, there is raw data to calculate the number of miles driven until the signal is reacquired. When the signal is reacquired, the last odometer reading taken while the satellite signal was being received is then used to report accurate miles driven. It is also contemplated that the cellular signal can be lost during operation. If the cellular signal is lost while receiving the GPS signal, the GPS coordinates are stored in a buffer to be transmitted to the server when the Cellular signal returns (as it is the case during a handover between cell towers). Hence there is no loss of GPS data to accurately calculate the RUC charge. In the case of the mobile device doing the calculation, the loss of the cellular signal does not impact the mileage reporting because all communications with the server are held-up until the Cellular signal is recovered.

Figure 6:
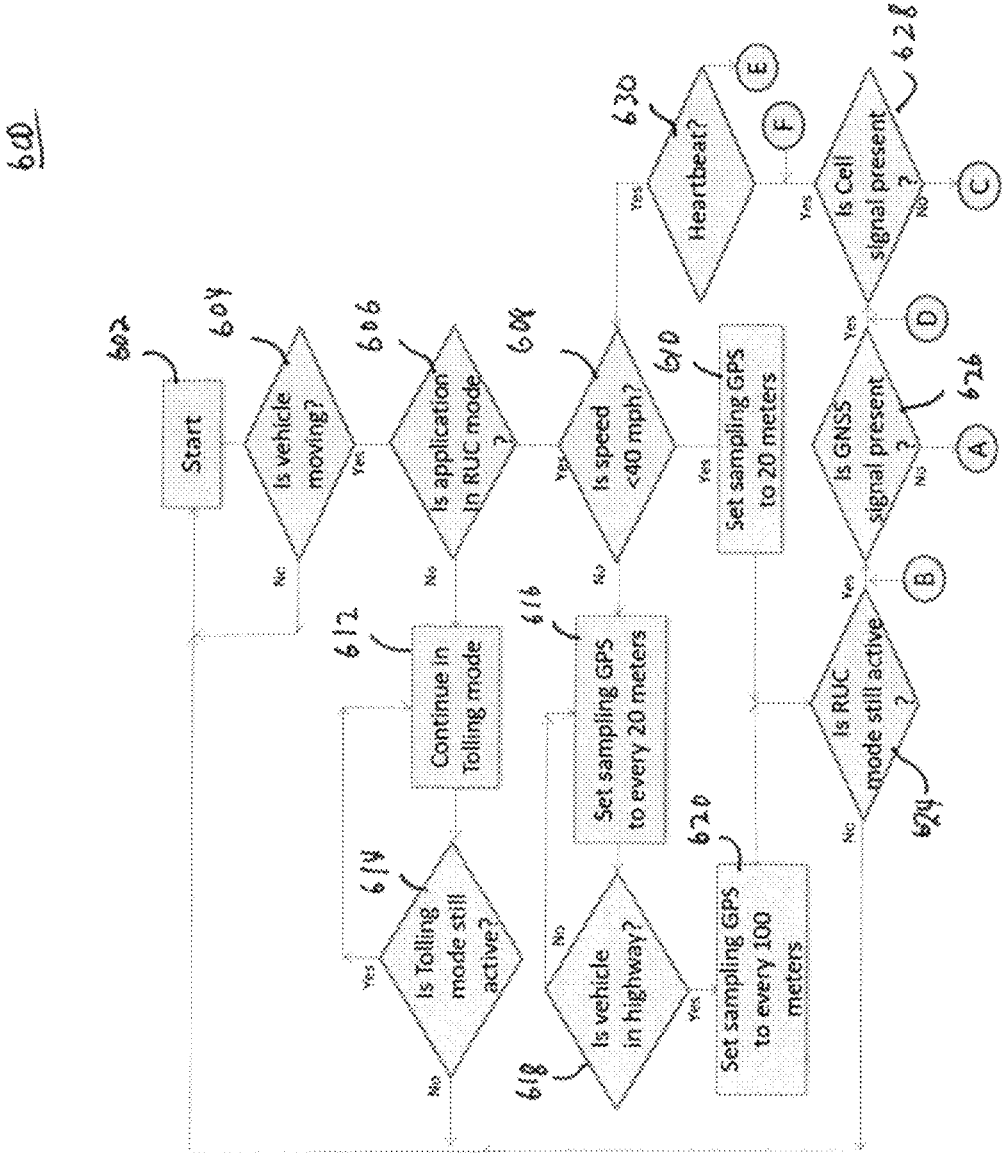
FIG. 6 shows a flow chart diagram of a method of performing adaptive location sampling rate, in accordance with some embodiments.

FIG. 6 shows a flow chart diagram of a method 600 of performing adaptive location sampling rate, in accordance with some embodiments. At the start 602, in accordance with the present example, a mobile device (e.g., 'smartphone') is in a vehicle and operating an application program that can, among other things, track distance driven by the vehicle. The application program can operate in accordance with an account maintained on a remote server that is associated uniquely with the vehicle, and the application program verifies that it is in the vehicle by, for example, communicating with a component of the vehicle such as the vehicle computer, or a wireless audio system interface transceiver that has a unique identifier (e.g., media access controller address). Further, the application program as operated on the mobile device can confirm that the mobile device is in the vehicle by, for example, determining that the vehicle is moving, based on a change in location, while the mobile device is still able to communicate with a vehicle system. Thus, in step 604, movement of the vehicle can be determined by using the satellite positioning receiver of the mobile device and determining that the location of the mobile device is changing over time. In step 606 the it is determined whether the application program is in a road usage charge mode. This can be a setting selected by a user or it can occur automatically when the location of the vehicle indicates that it is located in a jurisdiction that requires distance driven tracking for the purpose of collecting road usage charges. If the application program is not in RUC mode, then it can continue in a tolling mode in step 612 to transact toll charge for toll lanes and roadways, in accordance with prior art mobile tolling. In step 614, while in tolling mode, the application program can continue to check that it is still in tolling mode, and if not, return to the start, or to step 604. The application program can exit tolling mode by being switched, manually or automatically, to RUC mode, for example. Tolling mode can also end when the vehicle is stopped and turned off, as indicated by a loss of connection between the mobile device and the vehicle.

When the application program is in RUC mode in step 606, the method 600 proceeds to step 608 where the application program/mobile device determines the speed of the vehicle based on location samples, and compares it to a speed threshold, which in this case is forty miles per hour. If the vehicle is moving below the threshold speed, then in step 610 the location sampling rate for tracking distance driven is set to a relatively short interval such as, for example, every 20 meters. Location positions are then recorded at every 20 meters. The mobile device monitor the output of the satellite location receiver and when the output indicates the vehicle has moved 20 meters the location sample can be captured and stored by the mobile device. The method 600 then proceeds to step 624 where it determines whether the RUC mode is still active, and if so the mobile device can then check signal integrity in steps 626, 628, and 630. These will be elaborated on further in FIGS. 7A-7C, but briefly, in step 626 the mobile device checks the quality of location satellite signals, in step 628 the mobile device determines whether there is a cellular data link present, and in step 630 the mobile device determines whether there is a 'heartbeat' connection maintained with a backend server through the cellular data connection.

Returning to step 608, when the vehicle speed exceeds the selected threshold speed, the method 600 proceeds to step 616 where the sampling interval can be initially set to the same interval used in step 610, but then in step 618 it can be determined whether the vehicle is on a highway, or a similar restricted access roadway such that it is unlikely that the vehicle will make sharp turns, then the location sampling interval can be set to a higher less frequent interval such as, for example, every 100 meters in step 620. In subsequent iteration of the loop, step 616 can be skipped until in step 618 it is determined that the vehicle is no longer on a highway or equivalent roadway.

Figure 7C:
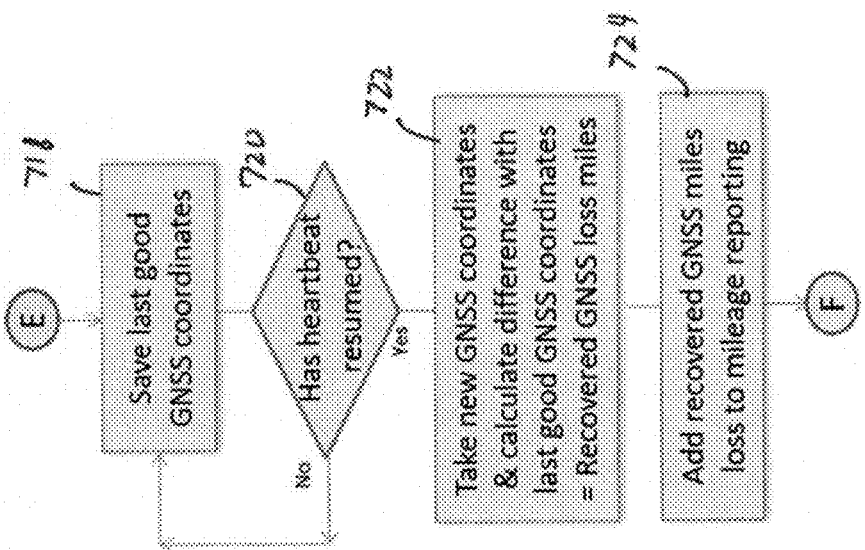
FIGS. 7A-7C shown flow chart diagrams to deal with types of signal loss while tracking distance driven, in accordance with some embodiments.
Figure 7B:
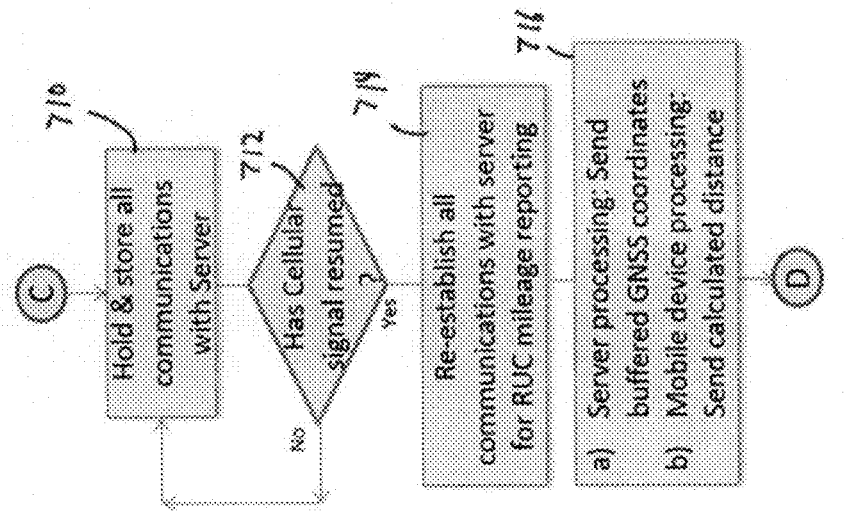
Figure 7A:
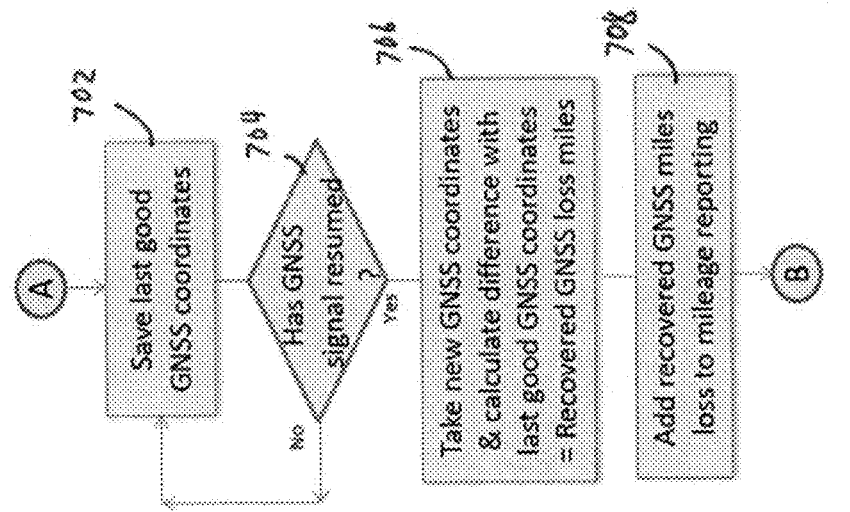

FIGS. 7A-7C shown flow chart diagrams to deal with types of signal loss while tracking distance driven, in accordance with some embodiments. FIG. 7A deal with loss of the satellite positioning signals, as indicated in step 626. FIG. 7B deals with loss of cellular communications between the mobile device and a cellular communications infrastructure, as identified in step 628. FIG. 7C deal with the loss of connection to the backend server as identified in step 630.

In FIG. 7A, it is assumed that in step 626 that satellite positioning signal(s) are no longer sufficient to provide accurate, timely location readings. In response, in step 702, the mobile device saves the last good location reading coordinates, and then in step 704 wait for the satellite signal to resume at the minimum quality level. Alternatively, if available, the mobile device can query the vehicle system and obtain the odometer reading when the loss of signal is detected. Entering the method of FIG. 7A can be caused by receiving less than a minimum number of satellite signals (e.g., signals from different satellites), as well as a general loss of signal power, as can happen when the vehicle, for example, enters a tunnel. In step 706, when the signal has resumed, the latest good location reading coordinates are used to calculate a difference in distance to the last stored coordinates, or, if the odometer reading is available, then the difference in odometer readings can be used. The difference is used as the estimate of distance driven and added to the distance driven that is reported to the backend server in step 708, and the method returns to step 626.

In FIG. 7B, from step 628, it has been determined that the cellular signal has been lost, preventing the mobile device from accessing the cellular communication infrastructure. As a result, in step 710, the mobile device will buffer (hold and store) communications that would have normally been sent to the backend server while the signal remains unavailable. In step 714, when cellular communications has been resumed, the mobile device can re-establish communications with the backend server, and in step 716 either report the total calculated distance driven since losing communications, or transmit the buffered location samples for the server to calculate distance driven. The method then returns to step 628.

In FIG. 7C, from step 630 in FIG. 6, the mobile device has cellular communication but the connection to the backend server is lost. The contingency method used is very similar to that of FIG. 7A, and in step 718 the last good location coordinates are stored until, as indicated in step 720, the connection is resumed. Then in step 722 a new set of location coordinates is obtained, and in step 724 the difference between the last coordinates prior to connection loss and the new coordinates when the connection resumed is determined and added as distance driven.

Figure 8:
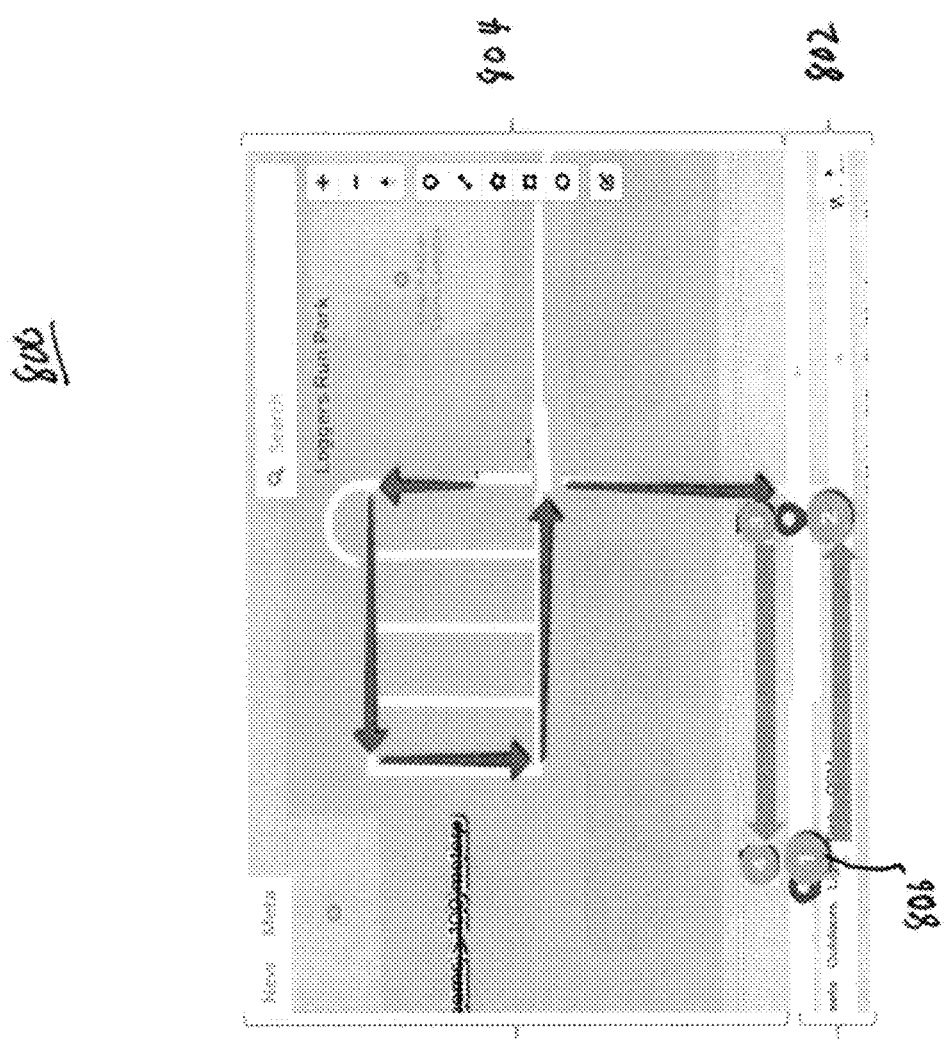
FIG. 8 shows an example of using geofences to identify regions for which distance tracking is not used, in accordance with some embodiments.

FIG. 8 shows an example 800 of using geofences to identify regions for which distance tracking is not used, in accordance with some embodiments. The example 800 shows a map and the arrows represent segments of driving done by a vehicle that is subject to road usage charges on the roadway in section 802, but exempt from paying road usage charges when in section 804, which is a parking lot. In order to differentiate, geofence overlays can be defined that indicate regions where the RUC does not apply. Other geofence overlays can be defined that do require payment of road usage charges, or assessment of road usage charges can be the default unless the vehicle is in a region corresponding to one of the geofence overlays for which no road usage charge applies. Thus, a geofence overlay indicates a geofenced region such as region 804, and indicates that when the vehicle is located in region 804, no road usage charge is applied. As a result, the distance travelled by the vehicle while in region 804 is not reported or added to the total distance drive for RUC assessment purposes.

Figure 9:
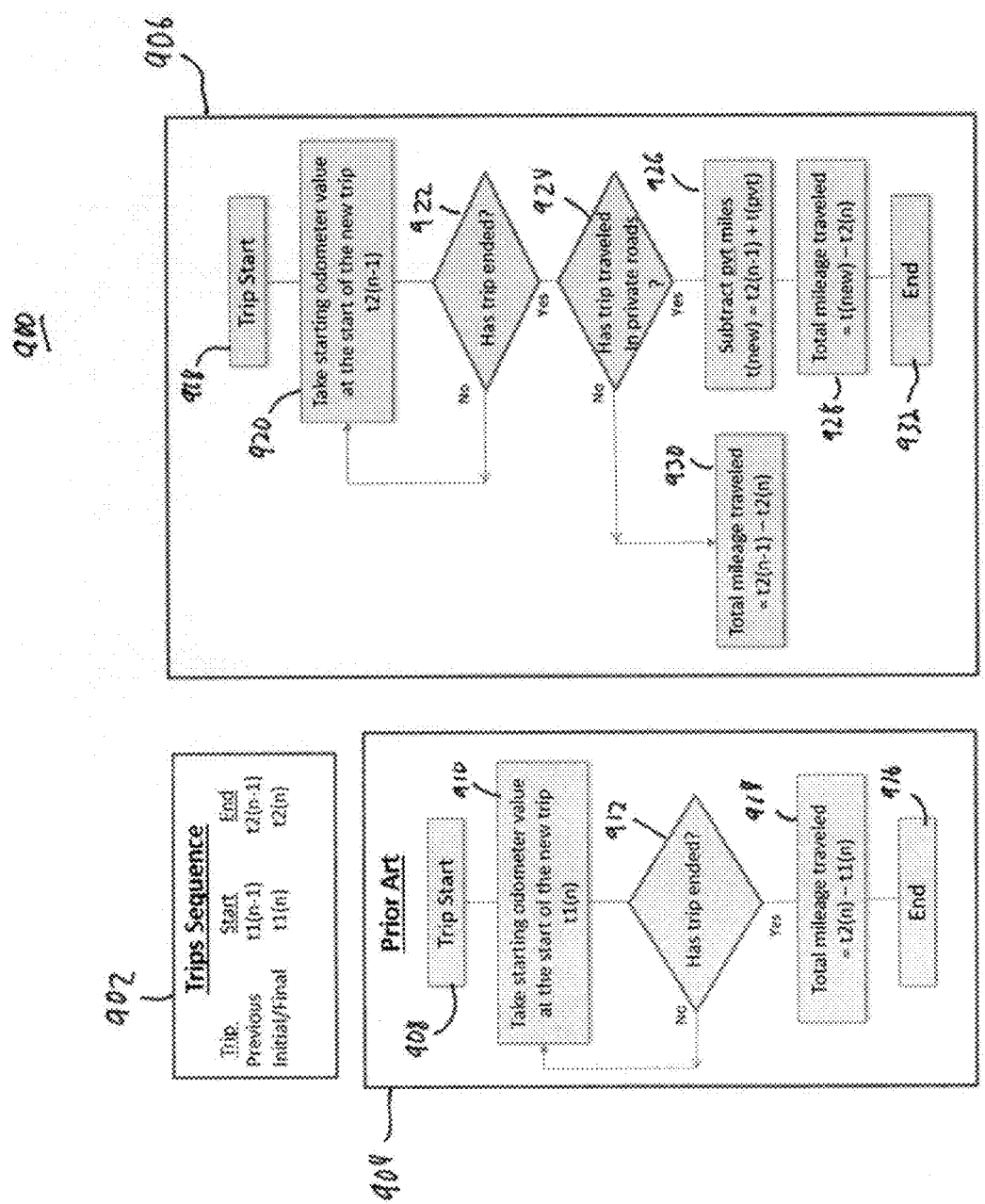
FIG. 9 shows a comparison between a flow chart diagram for a prior art method of reconciling miles driven with an example of a flow chart diagram for the inventive method.

FIG. 9 shows a comparison 900 between a flow chart diagram for a prior art method of reconciling miles driven with an example of a flow chart diagram for the inventive method. In section 902 there are shown two different ways for computing distance travelled when there is a loss of satellite signal for determining location. Every time the vehicle is started, and the mobile device begins to track distance travelled is considered a new trip. The odometer reading at the start and end of each trip can be recorded. For a previous trip there was an initial odometer reading $t1(n-1)$, where n is the trip number for the current trip. And the ending odometer reading for the previous trip is $t2(n-1)$. The initial odometer reading for the present trip is $t1(n)$, and the final odometer reading for the present trip will be $t2(n)$. In section 904 the prior art method of calculating trip length (while GPS/GNSS signal is lost), starts in step 908 where the present trip initial odometer reading $t1(n)$ is used. In step 912 the mobile device checks to see if the trip has ended (or signal resumed), and in when it does, in step 914 the total distance traveled is calculated as the trip end odometer reading minus the initial trip odometer reading, and the method ends.

Conversely, in the present method 906, at the trip start 918, the last odometer reading of the previous trip is used, $t2(n-1)$. In step 922 the system determines whether the present trip has ended, and if so, then in step 924 it is determined whether any private roads have been driven on. If not, when the total distance travelled for road usage charges is calculated in step 930 as the difference between odometer reading at the end of the previous trip, and the odometer reading at the end of the current trip. When private roads or other roads that are exempt from RUC have been driven during the present trip, then a new odometer adjustment is determined by subtracting the distance driven on private roads, $t(pvt)$, from the last odometer reading of the prior trip, $t2(n-1)$ to produce the offset $t(new)$. Then the total miles driven is calculated as the difference between the adjusted odometer value $t(new)$ and the odometer reading at the end of the current trip, $t2(n)$, and the method ends 932.

Figure 10:
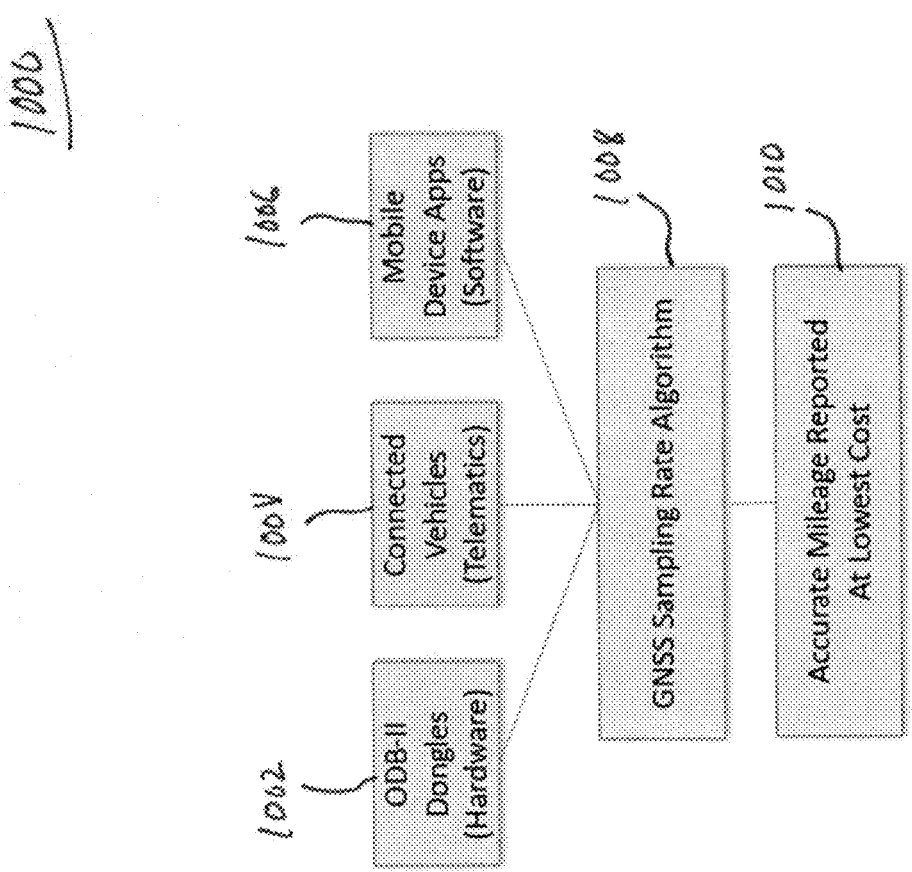
FIG. 10 show a schematic block diagram of the various ways of implementing an adjustable location sampling rate to track distance driven, in accordance with some embodiments.

FIG. 10 show a schematic block diagram 1000 of the various ways of implementing an adjustable location sampling rate to track distance driven, in accordance with some embodiments. The currently described adaptive algorithm can be adopted by existing ODB-II dongle devices, as indicated in 1002. In 1004 the algorithm can be adopted by existing telematics systems in a vehicle. And in 1006 the algorithm can be implemented as part of an application program operated on a mobile device. In all cases there is a dynamic, speed-based dynamic location sampling rate used to determine location in 1008, and from locations derive the most accurate distance in 1010.

Figure 11:
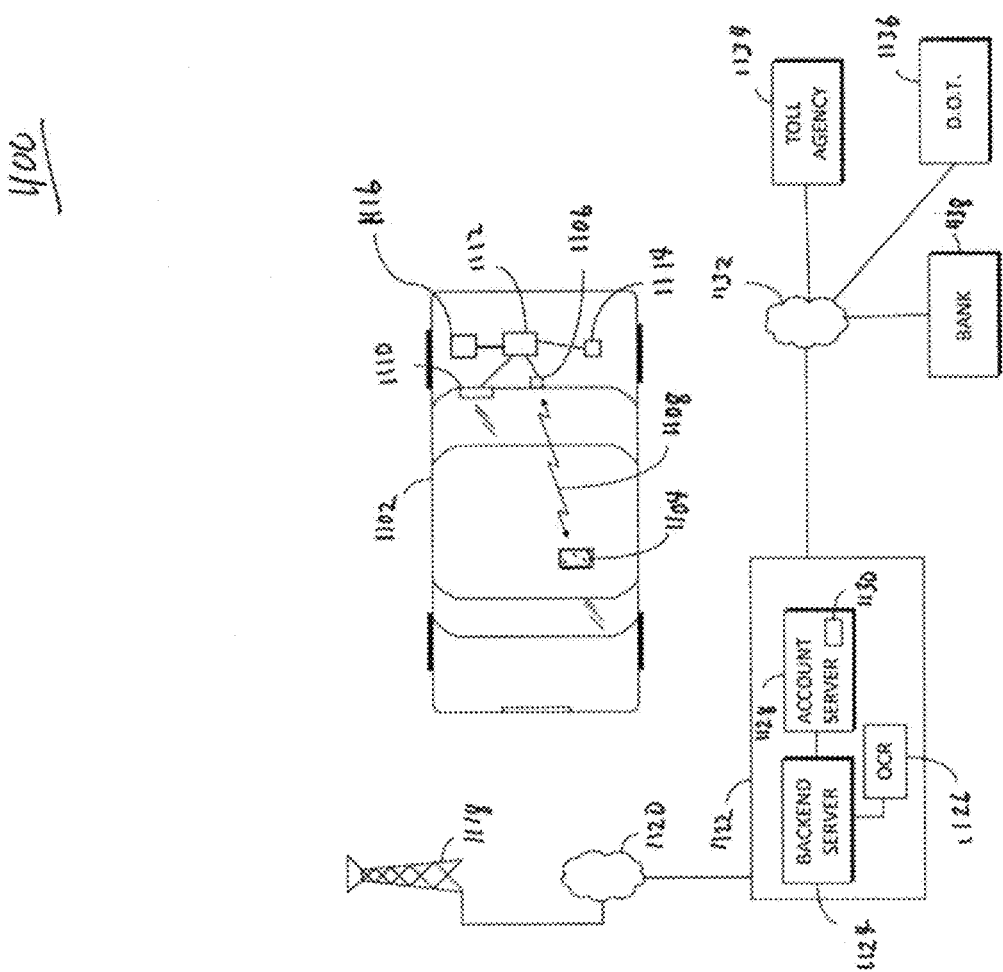
FIG. 11 shows a system diagram for tracking distance driven using an adaptive location sampling rate, in accordance with some embodiments.

FIG. 11 shows a system diagram of road usage charge system 1100 in accordance with some embodiments. The distance travelled by a vehicle 1102 is used to determine a road usage charge to be assessed and paid by the vehicle operator. In particular, settlement of the road usage charge is performed by a service operator 1122 which maintains a financial account 1130 associated with the vehicle 1102. The financial account includes information about the vehicle 1102, the operator or owner of the vehicle 1102, and a monetary balance held in trust for payments associated with the vehicle 1102. In some embodiments the service 1122 can be a toll service that pays vehicular tolls from the account 1130 for the vehicle 1102. A mobile device 1104 can be used to access and interact with the system 1122 and account 1130, and to report information to the system 1122 indicating the distance travelled by the vehicle 1102. Distance information can be acquired by the mobile device 1102 and reported to the system 1122 in a number of ways.

Once an account 1130 is established, the mobile device 1108, by performing code for a suitable application program, can detect the vehicle 1102 by a personal area network (PAN) beacon transmitted by a PAN transceiver 1106 of the vehicle 1102. A PAN is a short range wireless communication protocol. The PAN transceiver, in addition to other information, will transmit its media access control (MAC) address, which is a unique, hard-coded address that is provided by the manufacturer of the PAN transceiver. The PAN can use a protocol such as that specified by the Institute of Electrical and Electronic Engineers (IEEE) specification 802.15, commercial implementations of which include that known by the trade name "BlueTooth." Upon detecting the vehicle's PAN 1106 from, for example, a beacon or other transmitted signal intended to allow other devices to discover the PAN 1106, the mobile device 1104 can "pair" with the vehicle. Pairing refers to establishing a link between the mobile device 1104, and the PAN transceiver 1106 using the PAN protocol. Given that the PAN operates at a short range, and is only available when the vehicle 1102 is turned on, the mobile device 1104 can infer that it is substantially co-located with the vehicle 1102 upon the mobile device 1104 pairing with the vehicle 1102 using the vehicle PAN 1106. Accordingly, while paired with vehicle 1102, the mobile device can determine, in some embodiments, movement of the vehicle 1102. For example, in some embodiments, the mobile device 1104 can be equipped with a satellite positioning receiver, such as a global positioning satellite (GPS) receiver. Using a mapping function or application of the mobile device 1104, the mobile device can determine its position, and hence the distance it has moved while paired with the vehicle 1102. The mobile device 1104 can record distance information, and report it to the system 1122 periodically, or as an event-driven action.

The mobile device 1104 can be a small computing device having several radio transceivers to support different forms of wireless communication and reception of signals. For example, present day "smart phones" commonly have a BlueTooth transceiver, a wireless local area network (WLAN) transceiver, a cellular transceiver, and a GPS receiver, and use an operating system that allows a user to load and install application programs, such as a road usage application, or an application including a road usage component, into the phone. The mobile device can access and report information to the system over a cellular system 1118, that can allow access to a public wide area network 1120, such as the Internet. The cellular system can be any of the presently operated cellular telephony communication systems, and can provide both voice and data services. The system 1122 includes one or more servers, such as, for example, a backend server 1124 and an account server 1128. The backend server 1124 can provide administrative and other services while the account server maintains the financial account 1130 associated with vehicle 1102 or mobile device 1104.

The vehicle 1102 can also include an ODB-II dongle device 1110. The dongle device 1110 can access a vehicle computer 1112. In some embodiments the vehicle computer 1112 can communicate odometer information to the mobile device via the PAN 106 or to the dongle device 1110, or both. In some embodiments the mobile device is equipped with a camera, as is common, and can capture an image of the odometer of the vehicle at different times and transmit the odometer images to the system 1122. Alternatively, the mobile device 1104 can receive odometer information from the computer 1112. The system 1122, at one of the servers of the system 1122 such as a backend server 1124 using an optical character recognition (OCR) engine 1126, can process the odometer images using optical character recognition, to determine the odometer value in each image. Distance travelled by the vehicle can be determined by comparing the distance values in different odometer images. The system 1122, upon determining an actual distance the vehicle has been driven, can determine a road usage charge corresponding to the distance driven. For example, the system 1122 can access a governmental agency, such as department of transportation (DOT) server 1136 to determine present road usage rates. In some embodiments a road usage charge can be settled by debiting the account 1130 by the road usage charge amount. The account 1130 can be replenished with funds from a bank 1138, as can be arranged by an operator of the vehicle 1102. In some embodiments, in addition to determining the road usage charge for the distance driven, the system 1122 or the DOT 1136 can determine a fuel tax paid by the operator of the vehicle 1102. The fuel tax can be determined by separate fuel receipt reporting where the operator of the vehicle reports actual receipts for fuel purchased for the vehicle. The accuracy of the reported fuel receipts can be verified by an estimated fuel consumption rate (e.g. distance driven per unit of fuel) for the vehicle type of the vehicle. For example, the DOT server 1136 can maintain a list of vehicles by manufacturer and model, and an estimated fuel consumption rate for each model of vehicle. A fuel tax can then be determined from the determined for the distance driven based on the estimated fuel consumption rate. In some embodiments, the vehicle fuel pump 1114 be used to determine an amount of fuel used by the computer 1112 of the vehicle 1102, which can transmit the amount of fuel pumped by the pump via a PAN 1106 or WLAN (not shown) to the mobile device 1104, which can report the fuel consumption to the system 1122. Further, the vehicle 1102 can report information directly using a cellular transceiver 1116 that is in the vehicle 1102, separate from the mobile device 1104.

Figure 12:
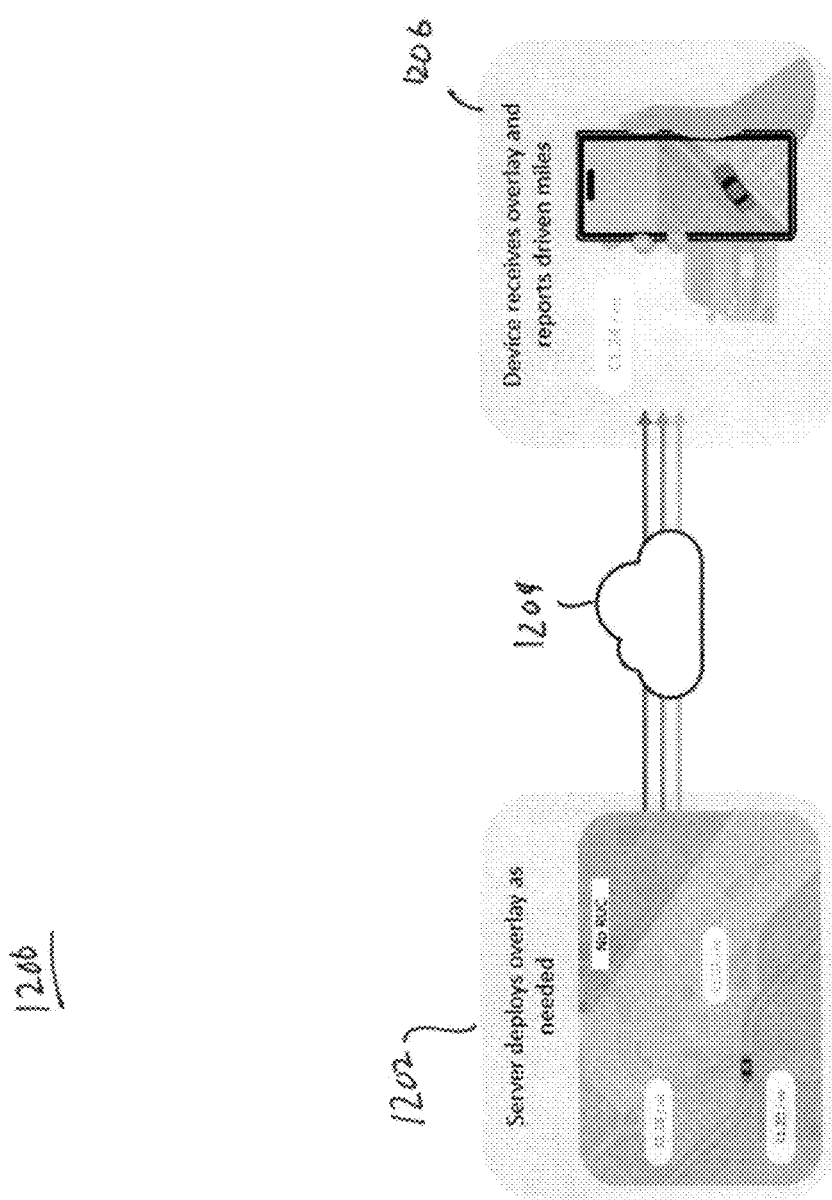
FIG. 12 show a system diagram for using geofence overlays to exclude distance driven in private regions, in accordance with some embodiments.

FIG. 12 show a system diagram 1200 for using geofence overlays 1202 to exclude distance driven in private regions, in accordance with some embodiments. The system can employ a geofence server to provide geofence overlays of private regions in the vicinity of the vehicle based on reported location of the vehicle. The geofence overlays can define regions where a RUC does not apply, and thus distance driven in the regions corresponding to the geofence overlays is excluded and not counted towards distance driven for RUC. The geofence overlays can be transmitted over a data connection 1204 to the mobile device 1206 and used by the mobile device to exclude distance driven in the exempted regions.

Figure 13:
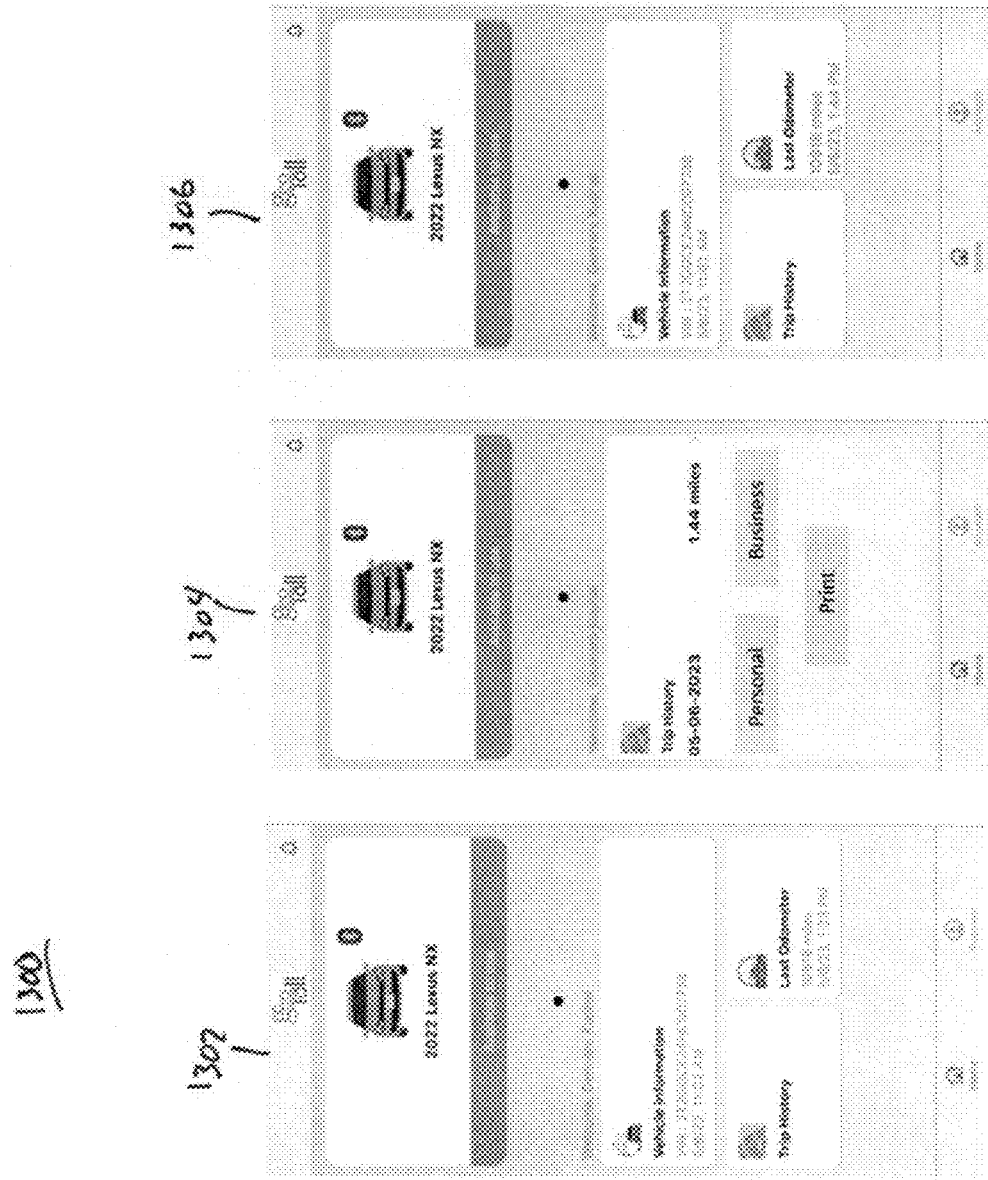
FIG. 13 show a series of application program interface on a mobile application for indicating a type of trip for distance driven tracking purposes, in accordance with some embodiments.

FIG. 13 show a series of application program interfaces 1300 on a mobile application for indicating a type of trip for distance driven tracking purposes, in accordance with some embodiments. In interface 1302 the initial trip interface is shown with an initial odometer reading. In interface 1304, at the end of the trip, the user can be prompted to select the purpose of the trip, either personal or business, with the trip distance being displayed. Then in interface 1306 final trip information is displayed, showing the new odometer information. Business travel road usage charge may be tracked for tax purposes.

Figure 14:
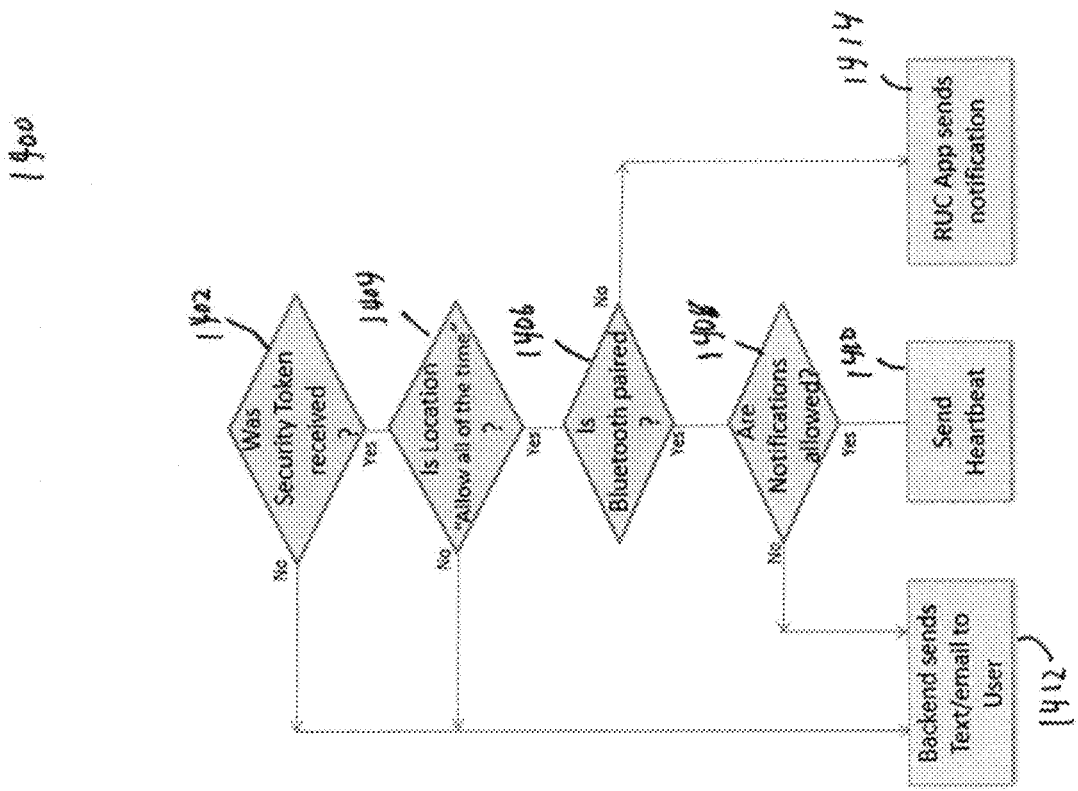
FIG. 14 shows a flow chart diagram of a method of reporting distance driven from a vehicle, in accordance with some embodiments.

FIG. 14 shows a flow chart diagram of a method 1400 of reporting distance driven from a vehicle, in accordance with some embodiments. Reporting can be done securely, such that in step 1402 a permission token may be received from the backend server. If the system does not use a permission-based secure system, then in step 1412 the backend server can send a text message or email to the user to operate the application program to report distance driven information. If a token is received in step 1402, then in step 1404 the mobile device or reporting device/system can determine whether the location is one that allows location reporting all the time. If not, then the method 1400 proceeds to step 1412. If location reporting is allowed at any time, then the method 1400 checks to see if mobile device is currently connected to the vehicle, and if not, then the application program sends a notification to the backend server that it has data to report. Otherwise in step 1406 the method 1400 proceeds to step 1408 to determine if notifications are allowed, and if so, the mobile device can transmit a heartbeat to ensure there is a connection available to report live data, otherwise, the method proceeds to step 1412.

What is claimed is:

1. A method for determining a distance driven by a vehicle, comprising:
    at the vehicle, determining a speed of the vehicle;
    when the speed of the vehicle is above at or above a first speed threshold value, sampling the location of the vehicle at a first rate;
    when the speed of the vehicle is below the first speed threshold value, sampling the location of the vehicle at a second rate such that sampling at the second rate occurs more frequently than sampling at the first rate;
    recording each location sample to produce a location record comprising a plurality of location samples; and
    determining distance driven by the vehicle by summing the distance offsets between successive location samples of all of the plurality of location samples.

2. The method of claim 1, further comprising determining that the vehicle is on a private roadway, and while the vehicle is on the private roadway, suppressing location sampling, and when determining the distance driven determining a first sum that occurred before the vehicle entered the private roadway and a second sum that occurred after the vehicle left the private roadway and summing the first and second sums.

3. The method of claim 1, wherein the first rate and second rate are distance intervals, and not time intervals.

4. The method of claim 3, wherein the first rate is every 100 meters of distance travelled.

5. The method of claim 3, wherein the second rate is every 20 meters of distance travelled.

6. The method of claim 1, wherein the first rate is a distance interval and the second rate is a time interval.

7. The method of claim 1, wherein the first speed threshold is in a range equivalent to 35 to 45 miles per hour.

8. The method of claim 1, further comprising:
    receiving a geofence overlay defining a region in which a road usage charge is not assessed;
    determining that a portion of plurality of location samples are within the geofence overlay; and
    subtracting a distance driven in the region from the sum of the distance offsets.

9. The method of claim 1, further comprising:
    determining that a satellite signal used for sampling the location, has been lost;
    responsive to determining that the satellite signal has been lost, saving the last location sample;
    determining that the satellite signal has been reacquired; and
    responsive to determining that the satellite signal has been reacquired, obtaining a new location sample, and calculating a distance driven while satellite signal was lost as a difference in distance between the last location sample and the new location sample.

10. A system for determining a distance driven by a vehicle, comprising:
    at a mobile device in the vehicle, the mobile device is configured to: determine a speed of the vehicle;
    when the speed of the vehicle is above at or above a first speed threshold value, the mobile device samples the location of the vehicle at a first rate;
    when the speed of the vehicle is below the first speed threshold value, the mobile device samples the location of the vehicle at a second rate such that sampling at the second rate occurs more frequently than sampling at the first rate;
    record each location sample to produce a location record comprising a plurality of location samples; and
    determine distance driven by the vehicle by summing the distance offsets between successive location samples of all of the plurality of location samples.

11. The system of claim 10, wherein the mobile device is further configured to determine that the vehicle is on a private roadway, and while the vehicle is on the private roadway, suppress location sampling, and determine a first sum that occurred before the vehicle entered the private roadway and a second sum that occurred after the vehicle left the private roadway and sum the first sum and second sums.

12. The system of claim 10, wherein the first rate and second rate are distance intervals, and not time intervals.

13. The system of claim 12, wherein the first rate is every 100 meters of distance travelled.

14. The system of claim 12, wherein the second rate is every 20 meters of distance travelled.

15. The system of claim 10, wherein the first rate is a distance interval and the second rate is a time interval.

16. The system of claim 10, wherein the first speed threshold is in a range equivalent to 35 to 45 miles per hour.

17. The system of claim 10, wherein the mobile device is further configured to:
    receive a geofence overlay defining a region in which a road usage charge is not assessed;
    determine that a portion of plurality of location samples are within the geofence overlay; and
    subtract a distance driven in the region from the sum of the distance offsets.

18. The system of claim 10, wherein the mobile device is further configured to:
    determine that a satellite signal used for sampling the location, has been lost;
    responsive to determining that the satellite signal has been lost, save the last location sample;
    determine that the satellite signal has been reacquired; and
    responsive to determining that the satellite signal has been reacquired, obtain a new location sample, and calculate a distance driven while satellite signal was lost as a difference in distance between the last location sample and the new location sample.

* * * * *